MAGNETIC RECORDING AND REPRODUCTION OF TELEVISION SIGNALS

Original Filed Sept. 20, 1960 8 Sheets-Sheet 1

INVENTOR
KENJIRO TAKAYANAGI
SUGURU TAKAYANAGI

BY Louis Bernat

ATTORNEY

MAGNETIC RECORDING AND REPRODUCTION OF TELEVISION SIGNALS

Original Filed Sept. 20, 1960 8 Sheets-Sheet 2

INVENTOR
KENJIRO TAKAYANAGI
SUGURU TAKAYANAGI

BY [signature]

ATTORNEY

INVENTOR
KENJIRO TAKAYANAGI
SUGURU TAKAYANAGI
BY Louis Bernat.
ATTORNEY

INVENTOR
KENJIRO TAKAYANAGI
SUGURU TAKAYANAGI

BY Louis Bernat
ATTORNEY

INVENTOR
KENJIRO TAKAYANAGI
SUGURU TAKAYANAGI

BY [signature]
ATTORNEY

INVENTOR
KENJIRO TAKAYANAGI
SUGURU TAKAYANAGI
BY Louis Bernat,
ATTORNEY

INVENTOR
KENJIRO TAKAYANAGI
SUGURU TAKAYANAGI

BY Louis Bernat
ATTORNEY

Dec. 24, 1968 KENJIRO TAKAYANAGI ETAL 3,418,424

MAGNETIC RECORDING AND REPRODUCTION OF TELEVISION SIGNALS

Original Filed Sept. 20, 1960 8 Sheets-Sheet 8

INVENTOR
KENJIRO TAKAYANAGI
SUGURU TAKAYANAGI

BY Louis Bernat

ATTORNEY

United States Patent Office 3,418,424
Patented Dec. 24, 1968

3,418,424

MAGNETIC RECORDING AND REPRODUCTION OF TELEVISION SIGNALS

Kenjiro Takayanagi, Tokyo, and Suguru Takayanagi, Yokohama, Japan, assignors to Victor Company of Japan, Limited, Yokohama, Japan, a corporation of Japan Continuation of application Ser. No. 57,168, Sept. 20, 1960. This application Aug. 30, 1965, Ser. No. 483,678
Claims priority, application Japan, Oct. 9, 1959, 34/32,027
11 Claims. (Cl. 178—6.6)

ABSTRACT OF THE DISCLOSURE

A machine for magnetically recording and reproducing television signals utilizes a guide drum having a magnetic tape partially wrapped around the drum. A pair of magnetic recording heads alternately scan tracks running diagonally across the tape. In order to cause the tape to run smoothly and without jitter, flutter, ripple, and other mechanical distortions, a pair of guide poles are arranged to lead the tape entering and leaving the wrap around the drum. The guide poles are perpendicular to the magnetic tape at their point of contact with the tape —which means that they are not perpendicular to either the drum or the general magnetic recorder surfaces.

This invention relates to a magnetic recording and reproducing system and more particularly to a system for magnetically recording and reproducing the video signal or the like on a magnetic tape. With the system, it is possible to obtain continuous recording or reproducing with high fidelity and without any jitter effects or distortions and with a smooth drive of the tape, without large driving forces and with minimum tension on the tape and minimum friction so as to promote a long tape life. At the same time, the system is comparatively simple and readily operated, and it is highly reliable.

This application is a continuation of our copending patent application Ser. No. 57,168, filed Sept. 20, 1960 entitled a Recording System and now abandoned.

Magnetic recording and reproducing systems are known in which a magnetic tape is wound spirally about a tape guide drum divided into two axially spaced portions to expose an oblique track on the tape, one or more heads being rotated within the drum for movement along the oblique track. In such systems, supply and take-up reels have been mounted on axes parallel to the drum axis and in parallel planes at different levels, with guide members for feeding the tape to and from the drum. In one such system, the tape extends for nearly the full 360° about the drum. In that system, there is a high degree of friction, and it is difficult to avoid a gap in the recording or reproducing operation.

In another of such prior systems, two magnetic heads are provided at diametrically opposed positions, with the tape extending for 180° on the drum. In such a system, it has been necessary to provide guide members inclined at opposite angles to the axis of the drum in order to feed from and to the supply and take-up reels mounted in parallel planes on spaced parallel axes. As a practical matter, it has been found that such systems are not satisfactory and that the friction and tension of the tape are great, reducing the life of the tape. In addition, the feed is not smooth with jitter being produced, and with reduced fidelity. A further disadvantage is that it has been necessary to use an angle equal to 180°, within very close limits, in order to minimize the drive force and the friction. As a result, it has been difficult to maintain continuity in the recording and reproducing.

This invention was evolved with the object of providing a magnetic recording and reproducing system overcoming the disadvantages of such art systems, with the tape being fed smoothly with minimum friction and with minimum required driving force.

Another object of the invention is to provide a magnetic recording and reproducing system in which the signal is recorded continuously without jitter and with high fidelity.

Still another object of the invention is to provide a system specifically designed for the magnetic recording and reproducing of a video signal to obtain maximum accuracy and fidelity of recording and reproducing, coupled with high stability and reliability.

A further object of the invention is to provide a system in which initial threading of the tape is facilitated.

A still further object of the invention is to provide a system in which erasing or monitoring can be readily accomplished.

This invention contemplates other and more specific objects, features, and advantages which will become more fully apparent from the following detailed description taken in conjunction with the accompanying drawings which illustrate preferred embodiments and in which.

Figure 1:
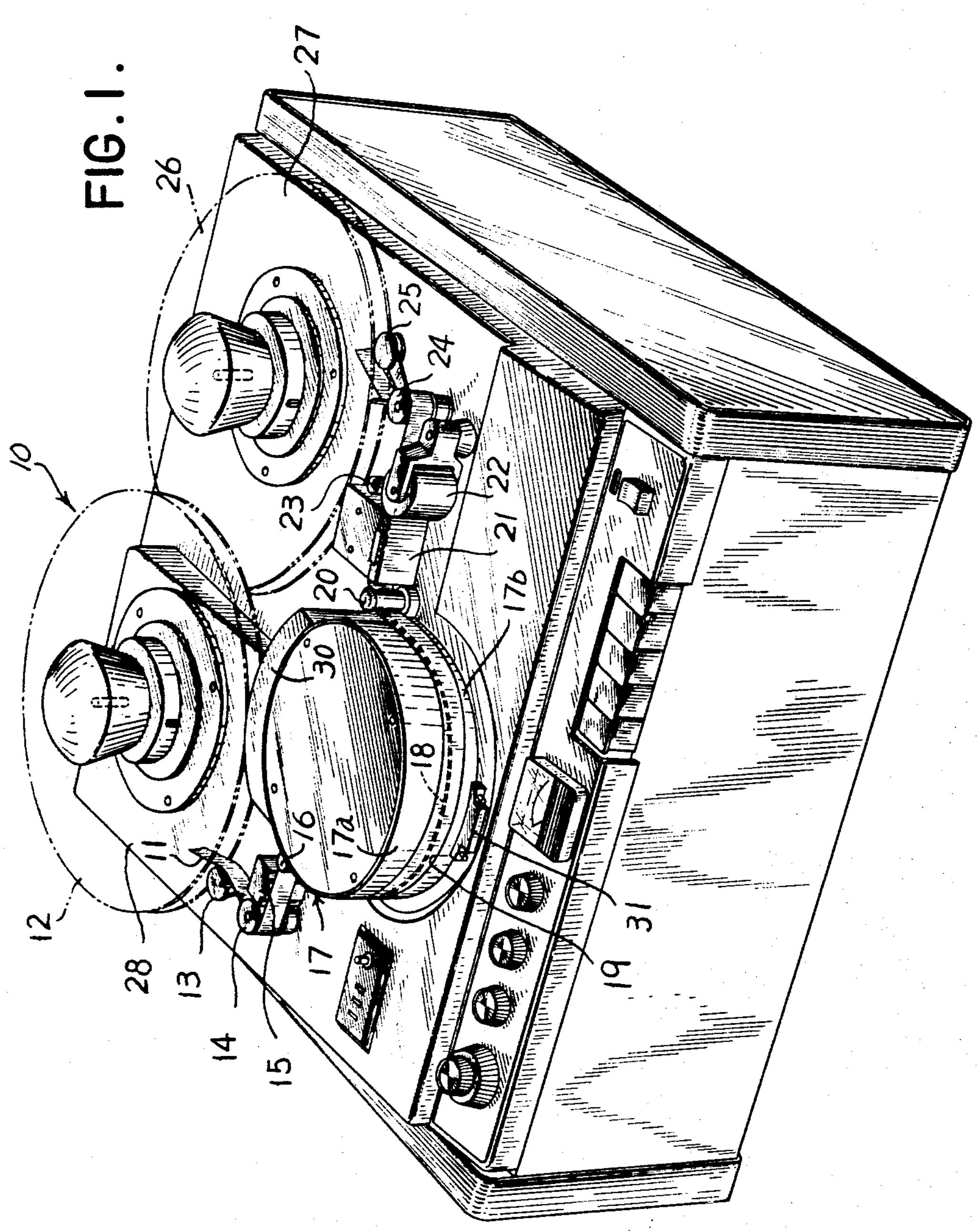
FIGURE 1 is a perspective view of a magnetic recording and reproducing system having a tape guide and recording head arrangement constructed in accordance with the principles of this invention.
Figure 2:
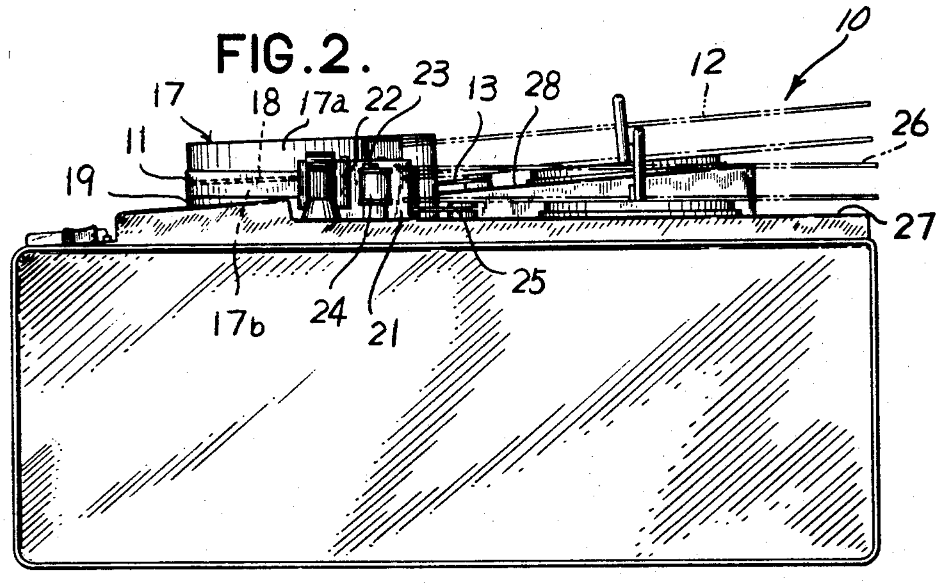
FIGURE 2 is a side elevational view of the system shown in FIGURE 1.
Figure 3:
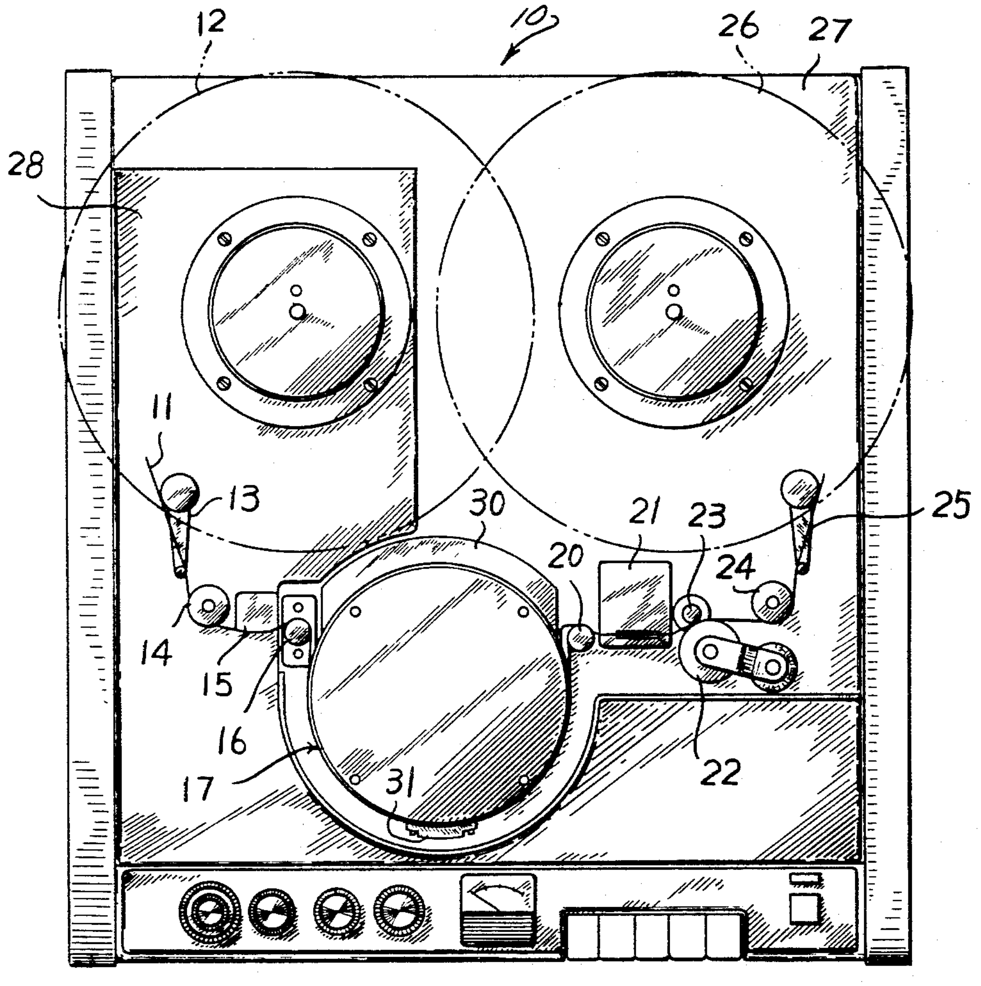
FIGURE 3 is a top plan view of the system of FIGURE 1.

Referring to FIGURES 1–3, reference numeral 10 generally designates a magnetic recording system which includes a tape supply arrangement of conventional construction, wherein a magnetic tape 11 is fed from a supply reel 12 past a guide on a tension arm 13 to a guide roller 14 and thence past a magnetic head 15 which erases the magnetism of the tape over the whole width thereof.

The tape is then fed to a tape guide and recording head arrangement constructed in accordance with the principles of this invention, and described in detail hereinafter. In general, the arrangement comprises a guide pole 16 which feeds the tape to a guide drum assembly 17, including an upper guide drum 17*a* and a lower guide drum 17*b* which are on a common axis and have adjacent edges axially spaced to form an annular gap 18 therebetween, the tape being wound in a spiral path around the drum. The lower guide drum 17*b* is preferably formed with a step portion 19 arranged spirally for engaging the edge of the tape and accurately fixing its position.

The tape is then fed to a second guide pole 20 and thence to a conventional take-up arrangement, wherein the tape travels past a fixed magnetic head 21, operative for recording or reproducing audio and control signals, and thence to a drive capstan 23 against which the tape is held by a pinch roller 22. The tape then travels past a flanged guide roller 24 and thence past a guide on a tension arm 25 to a take-up reel 26. The guide pole 20, capstan 23, pinch roller 22, and take-up reel 26 are supported from a base surface 27 with their axes normal thereto, while the supply reel 12, guide roller 14 and guide pole 16 are supported from a base surface 28 with their axes normal thereto, surface 28 being inclined relative to surface 27, as discussed hereinafter.

As also shown in FIGURES 1–3, a frame 30 is provided for supporting the upper guide drum 17*a* and a table 31 is provided for supporting a microscope (not shown) used in adjustment as hereinafter described.

FIGURES 4–7 show the essential elements and features of the tape guide and recording head arrangement of this invention. In this arrangement a suitable electric motor 32 is provided which drives a rotatable wheel or disc 33 through a shaft 34 to which the disc 33 is secured. The disc 33 carries a pair of diametrically opposed recording and reproducing heads 35*a* and 35*b* on the periphery thereof, movable in the annular gap 18 between the upper and lower guide drums 17*a* and 17*b*. The tape 11 is moved in the direction indicated by the arrow X by the supply and take-up arrangements above described, while the disc 33 is preferably driven in a direction as indicated by arrow Y, the heads 35*a* and 35*b* being thereby moved along the tape in a preferred direction opposite the direction of the tape movement. However, the heads could be moved in the same direction as the tape.

Figures 4, 5, 6, 7:
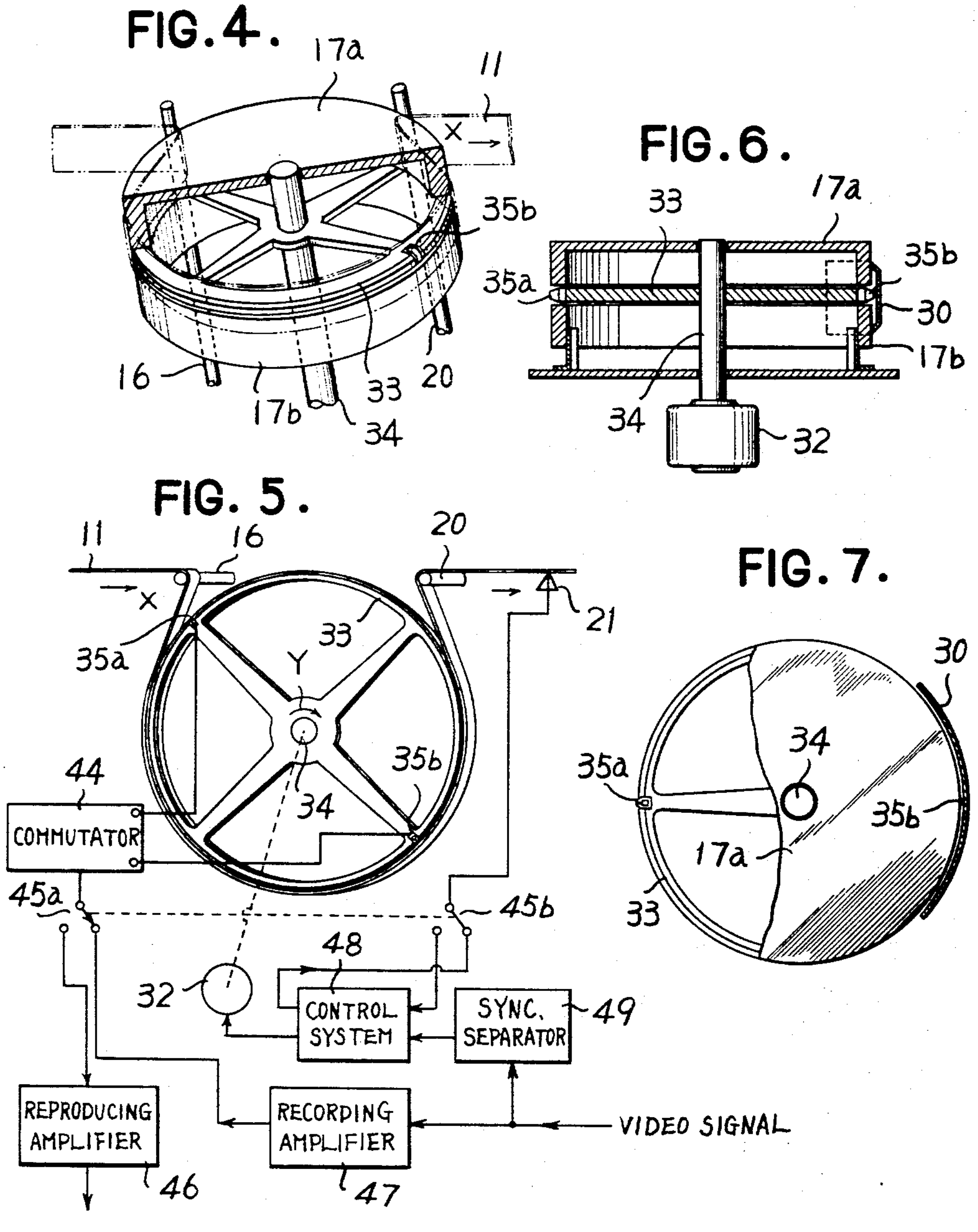
FIGURE 4 is a perspective view showing certain essential features and elements of the tape guide and recording arrangement of the invention.
FIGURE 5 is a top plan view of the elements shown in FIGURE 4, with an upper guide drum removed, and also shows a diagrammatic block diagram of the electrical portion of the system.
FIGURE 6 is a sectional view of the elements shown in FIGURE 4, additionally showing the mounting of the guide drum on the base plate.
FIGURE 7 is a top plan view, partially in section, of a guide drum rotating disk element shown in FIGURE 4.

A very important feature of the invention is that as shown in FIGURES 4 and 5, the tape 11 is engaged with the drum 17 through an arcuate distance which is substantially greater than 180 degrees, preferably on the order of 200 degrees. It might appear that a distance equal to or only slightly greater than 180 degrees would be sufficient and that any greater distance would be undesirable in increasing friction. It is found, however, that a substantially greater distance produces results not otherwise attainable.

In particular, the heads must be precisely positioned relative to the tape in order to obtain satisfactory recording or reproducing, and a very slight variation in spacing can produce large changes in signal strength. For example, a spacing of 0.0001 inch can produce an attenuation of minus 55 decibels. Further, the heads must reach a stabilized temperature and must be clean for satisfactory recording or reproducing. As the tape comes from the guide pole 16, it approaches the drum 17 tangentially and at an angle relative to a plane transverse to the drum axis. As a result and due to air currents and other factors, a certain degree of flutter, ripple, and distortion of the tape is produced. Further, a bounce effect and a ripple are produced as each head comes into contact with the tape, producing in effect a relative damped sinusoidal movement between the tape and the head, requiring one or more cycles to damp out. As a result of all these factors, a certain stabilization region is required before the tape is properly oriented and before the head is cleaned and at the proper temperature and in uniform smooth contact with the tape. Further, there is a tendency to produce some degree of flutter as the tape leaves the guide drum, moving toward the guide pole 20. In practice, the wrap around or arcuate distance of interengagement between the tape and the drum measured angularly about the drum axis from the point where the tape initially engages the drum to the point where it leaves the drum, should be at least 190 degrees in order to obtain proper engagement between each of the two diametrically opposed heads and the tape through 180 degrees.

In addition, it is desirable to use a fading process in electrically combining the signals for the two heads, rather than an instantaneous switching process, thereby necessitating some degree of overlap between the two signals. For this reason it is desirable to increase the arcuate distance of engagement of the tape with the drum to obtain an overlap which is preferably on the order of 5 to 10 lines of the video signal, or 3 to 6 degrees of arcuate of arcuate distance.

Accordingly, the total arcuate distance shuold be at least 190 degrees to obtain the head-tape stabilization explained above, and should be increased to at least 193 degrees to obtain the desired signal overlap.

The distance should not be increased beyond a certain upper limit of about 210 degrees, however, as the friction and required drawing force would be increased, increasing the possibility of another type of tape flutter and a resultant jitter of the signal. In addition, the amount of tape required to record a given signal with a given resolution characteristic increases in direct proportion to the interengagement distance. Further, the heads are cooled when not engaged with the tape and heating and wear thereof is decreased and the life thereof is extended by minimizing the contact distance.

In order to more clearly demonstrate the critical arcuate distances, engineering examples are submitted. One (1) field equals approximately 262.5 H (scanning lines) which is equivalent to 180 degrees of arcuate distance. Furthermore, the incremental margin of build-up or rise time and the decay time approximates 280 microseconds. The increment of signal change or signal margin approximate 370 microseconds. Therefore, the summation of the rise time (280 microseconds) plus the signal change (370 microseconds), plus one (1) field, plus the signal change (370 microseconds) and the decay time or down time (280 microseconds) which summation is equivalent to 1,300 microseconds plus one (1) field defines the minimum arcuate distance. Thirteen hundred microseconds is equivalent to 20.5 H (scanning lines); and therefore 20.5 H plus one (1) field is equivalent to approximately 193 degrees which defines the minimum arcuate distance.

If the vertical blanking increment which is equivalent to approximately 21 H (scanning lines) the equivalent of 14.4 degrees is added to the minimum arcuate distance, the arcuate distance approximates 208.4 degrees which is equivalent to the suggested 210 degrees maximum arcuate distance which distance empirically has been determined as being sufficient and necessary. Any greater distance would create undesirable frictional forces.

There is thus a critical range of distances at which satisfactory results are obtained, and a critical distance within that range at which the optimum overall results are obtained. In practice, it is found that the distance should be from 190 degrees to 210 degrees and most preferably it is about 200 degrees to obtain head-type stabilization and signal overlap plus a safety factor to allow for variations in commutating action, and the like.

Another important feature of the invention is that the guide poles 16 and 20 are not oppositely inclined in the manner required in prior systems in which the supply and take-up reels are on a parallel axis in spaced parallel planes, in which case the top must extend spirally around guide surfaces. Instead, a straight-feed feature is used with the guide poles 16 and 20 positioned as shown in FIGURES 4 and 5, such that the edges of the portions of the tape approaching and leaving each guide pole are in the same planes perpendicular to the axis of the guide pole. With this comparatively simple straight-feed feature, a very smooth travel of the tape is obtained without any twisting action as obtained with other systems. The friction is at minimum and the required driving force is minimized, reducing wear and breakage of the tape, and also increasing the accuracy with which the tape can be fed. This feature is particularly advantageous in permitting the use of the increased arcuate distance of engagement as above described, further decreasing the production of jitter and other distortions.

In the arrangement as illustrated in FIGURES 1–3, the guide pole 20, as well as the capstan 23, pinch roller 22, guide roller 24, and take-up roll 26 are mounted with their axes perpendicular to base surface 27 which may be assumed to be horizontal, in parallel relation to a supporting surface, although the unit can be operated in other positions. In order to obtain the straight feed feature discussed above in connection with FIGURES 4 and 5, the axis of the guide drum portions **17*a* and 17*b* is at a certain non-perpendicular inclination with respect to the surface 27 and the axis of the guide pole 16 is at another and different non-perpendicular inclination with respect to the surface 27, the guide pole 16, guide roller 14 and supply roll 12 having their axes perpendicular to the surface 28 which is inclined relative to the surface 27**. It is believed that it may be helpful to point out how such inclinations can be calculated.

Figure 9:
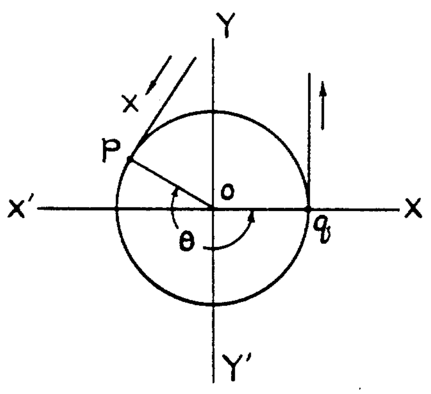
FIGURES 9–13 are geometric diagrams for exploring the advantages of the arrangement as shown in FIGURES 4–7.
Figure 10:
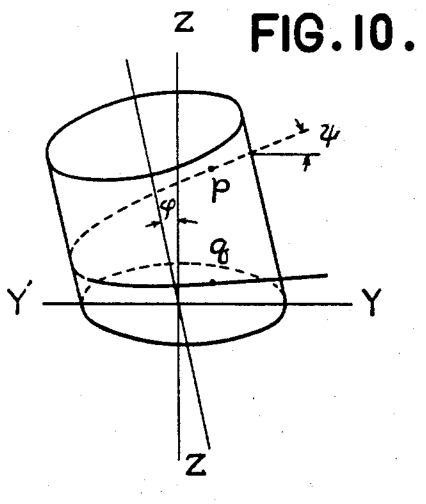

If it is assumed that the diameter of the guide drum is D, that the effective width of the tape occupied by the recorded track is $a$ and that the angle for winding the magnetic tape on the guide drum from a point P to $q$ is $\theta$ as shown in FIGURE 9, the length $l$ of the recorded track is given by $l=\pi D\ /360$, and the angle $\varphi$ of the recorded track subtending the edge of the tape is given by $\varphi = {}^{-1}a/l$. In the practical apparatus, the tape runs in a direction X marked by an arrow in FIGURE 9, but for convenience, the point $q$ at the outlet of the tape to the drum is considered as the cardinal point. At the point $q$, of course, the magnetic tape is wound on the guide drum with the angle $\varphi$ against a X–Y plane. Now, in order to make the edge of the magnetic tape at the point $q$ parallel with the X–Y plane and the face including said tape vertical against the X–Y plane, in a direction of Y′ in FIGURE 9, i.e., in a plane parallel to the plane including the magnetic tape at the point $q$, the shaft of the guide drum may be inclined by an angle $\varphi$. This condition is shown in FIGURE 10.

Next, the angle of inclination of the base surface 28 on a side of the point P of this inclined drum is required. Now, if the vector vertical against the X–Y plane is *in*, the vector in an advancing direction of the magnetic tape is *ir*, and the angle subtending the X–Y plane at the point P is $\psi$, $$ir \cdot in = /ir/in/\cos \pi/2 - \psi).$$

But $$in = o.i. + \sin \varphi \cdot j + \cos \varphi \cdot k$$
$$ir = -\cos \varphi \sin \theta \cdot i - \cos \varphi \cos \theta \cdot j + \sin \varphi \cdot k$$

so that, by the vector method of calculation $$\psi = \sin^{-1}\{\sin 2\varphi/2\ (1-\cos \theta\}$$

is obtained.

Figure 11:
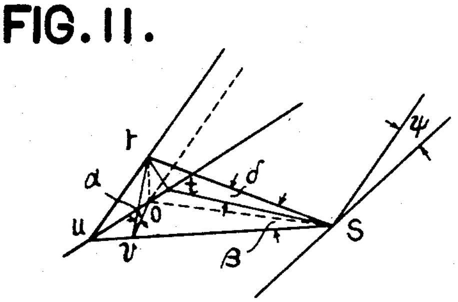
Figure 12:
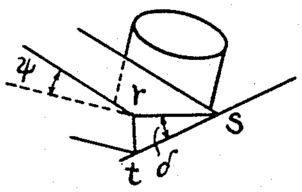

In order to make the base surface 28 parallel with the edge of the magnetic tape at the point P, the base surface 28 may be inclined by this angle $\psi$, but in order that this surface becomes vertical against the surface including the magnetic tape, it is necessary to incline by the angle $\psi$ forward against the X–Y plane and by the angle $\delta$ against a right side. But it is very difficult from the standpoint of accuracy of manufacture to provide two angles of $\psi$ and $\delta$ on the manufacturing of the base surface 28. Then, in this invention, the shaft of the drum is inclined in a vertical plane which is inclined relative to a forward vertical plane and a resultant angle is adopted for the base surface 28, such that base surface may be inclined only forwardly, The required angle of inclination of this base surface, namely, the resultant angle $\psi$ and $\delta$ is assumed to be $\alpha$. In FIGURE 11, if $$\angle\ rvo = \alpha,\ \angle\ rst = \delta,\ \angle\ rsu = \beta$$

then $$\beta = \tan^{-1} \overline{ru}/\overline{rs} = \tan^{-1}\{\sin \delta \cos \psi/\sin \psi\}$$

is obtained.

Omitting the vector calculation for $\delta$ $$\delta = \sin^{-1}\{-\sin \psi \sin \theta\}$$

and the required angle $\alpha$ is obtained, i.e.

$$\alpha = \sin^{-1} \overline{ro}/\overline{vr} = \sin^{-1}\{\sin \delta \cos \psi/\sin \beta\}$$

Figure 13:
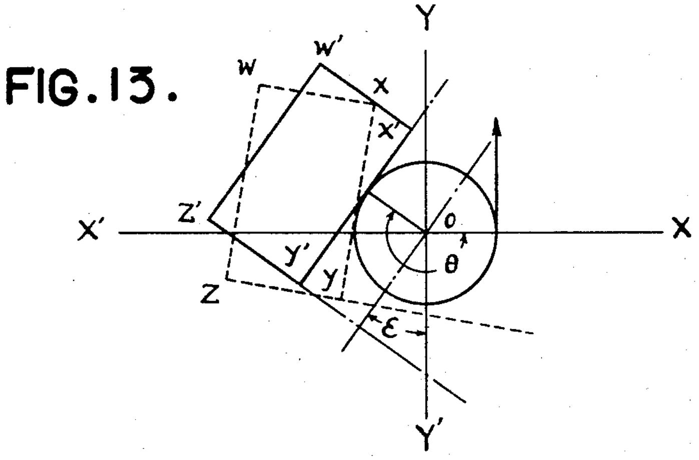

When the base surface is inclined only by this angle $\alpha$, the inclination may be satisfactory only in one direction, but by making the edge line to $\underline{us}$, the direction of the inclined surface changes from $\square\underline{wxyz}$ to $\square\underline{w'x'y'z'}$ as shown in FIGURE 13. Namely, it changes only by the angle between $\underline{y'z'}$ and $\underline{yz}$. Now, if this angle is assumed to be $\epsilon$, the angle $\epsilon$ is derived as follows:

$$\epsilon = \angle ust$$
$$= \angle utv = \cos^{-1} \overline{uo}/\overline{vo}$$
$$= \cos^{-1}\{\cos \beta \cos \alpha/\cos \psi\}.$$

Accordingly, when the base surface 27 for the take-up reel 26 and associated elements is in a horizontal plane, the edge of the magnetic tape as it leaves the guide drum is horizontal and if the guide drum is inclined by the angle $\varphi$ in such a way that the surface including the magnetic tape is vertical or normal to the horizontal plane, the base surface 28 providing the supply reel is inclined by the angle $\alpha$ against the horizontal plane, and the guide drum has its axis in a vertical plane shifted from the forward direction by the angle $\epsilon$, the straight-feed feature of this invention is obtained.

As a concrete numerical example, assume that the tape is engaged with the drum through an arcuate distance of 200 degrees. The base surface 28 for the supply reel may be inclined forward by 8°43′ relative to the horizontal base surface 27 for the take-up reel, and the axis of the guide drum may be inclined by 4°30′ and the direction of the inclination of the vertical plane of the drum axis is at an angle of 10°8′ in the counterclockwise direction from forward. As another example, when the base surface 28 for the supply reel 12 is inclined forward by 4°16′, the axis of the guide drum may be inclined by 2°10′ and the direction of inclination of the vertical plane of the drum axis is at an angle of 10°1′ in the counterclockwise direction from forward.

Accordingly, the edges of the portions of the tape approaching and leaving each of the guide poles 16 and 20 are in the same planes perpendicular to the axis thereof, and parallel to the respective one of the surfaces so that the running direction of the tape is not changed. The arrangement thus avoids the defects of conventional apparatus, wherein the magnetic tape is bent obliquely in the direction of the width of the tape and wherein the winding angle is limited. Thus, high driving force, tape friction, tension, and jitter are decreased.

Figures 14, 15:
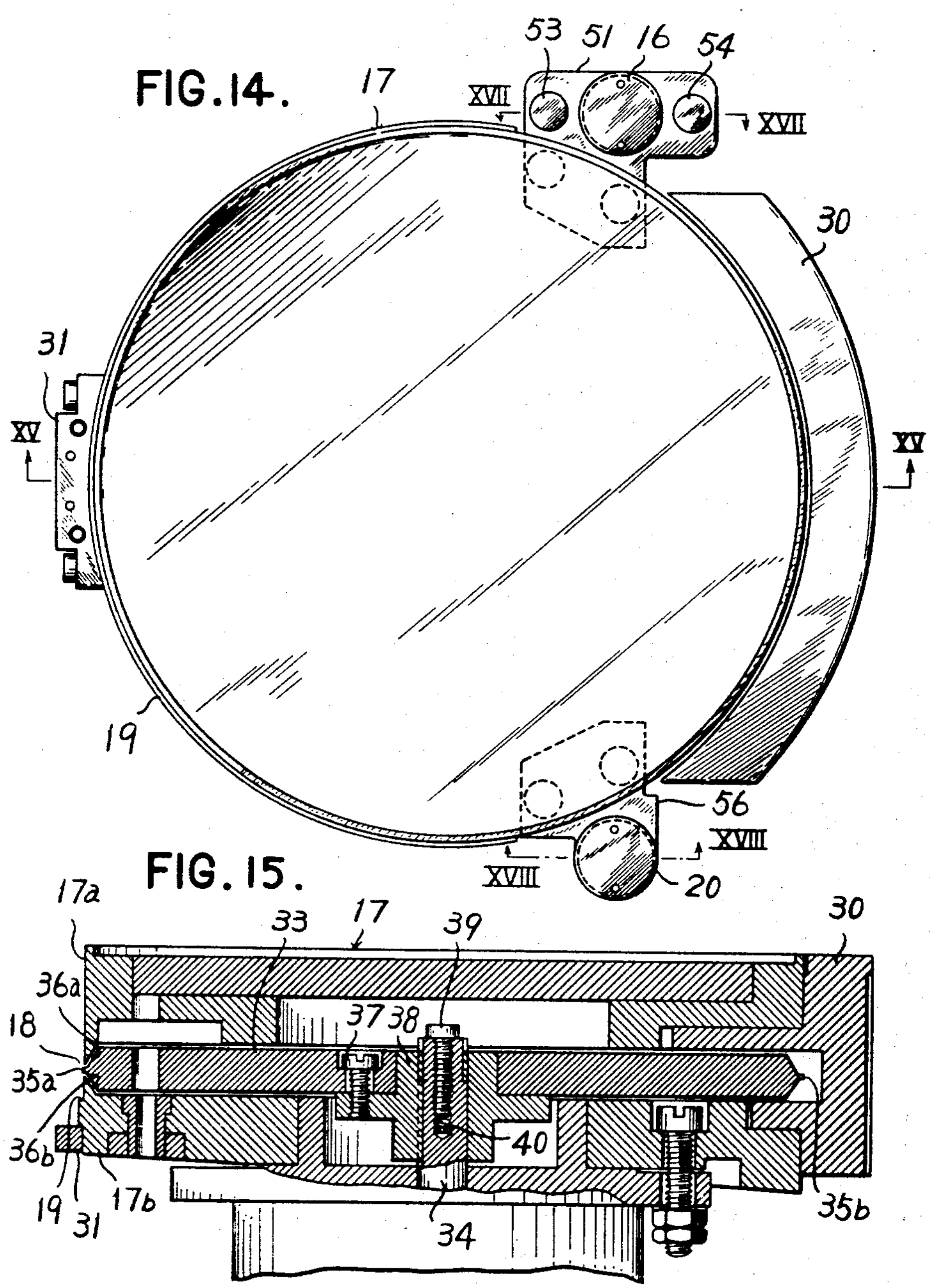
FIGURE 14 is a plan view of the guide drum of the system of FIGURES 1–3.
FIGURE 15 is a sectional view taken substantially along line XV—XV of FIGURE 14.

It is desirable to make the annular gap 18 as small as possible in order to permit the tape run in stable state without allowing the tape to move into the annular gap at the portions thereof initially and finally engaging the guide drum and also to decrease an outward blast of air for preventing the tape from being forced outwardly by pressurized air generated with the rotation of the rotary disc 33 such that the tape and the head tips might not properly engage. As illustrated in FIGURE 15, tapered parts **36*a* and 36*b* are provided at the respective adjacent ends of the both upper and lower guide drums and the periphery of the disc 33 has a complementary taper such that only the magnetic head tips extend a short distance out of the annular gap 18. An attaching screw 37 is provided for engaging a flange 38 fitted and fixed to the shaft 34 to secure the disc 33 thereto. An adjustment screw 39 is provided for adjusting the position of the disc axially and is rotatable only relative to the upper guide drum and is fixed thereto against movement upward and downward with its threaded part being screwed into an internally threaded opening 40 in the head of the shaft 34. The disc 33 is moved up and down by rotating the screw 39 and this adjustment is made while observing by means of a microscope attached to the microscope table 31 in such a way that the head tips of the magnetic heads 35***a*, 35*b* are in the proper positions in the annular gap 18.

Figure 16:
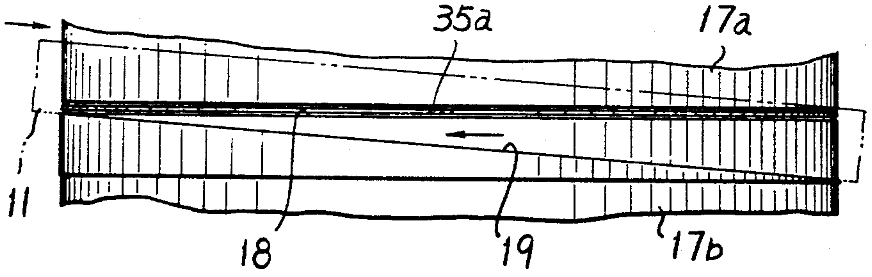
FIGURE 16 is a partial front elevational view of the guide drum shown in FIGURE 14.

FIGURE 16 is the partial front view of the guide drum part 17. The magnetic tape 11 runs obliquely in a direction marked by an arrow X on the upper and lower drums with its lower edge guided along the step portion 19 in such a way that the annular gap 18 extends diagonally from one side to the other of the magnetic tape but leaving small blank parts on the side edges of the magnetic tape 11. The magnetic heads 35*a* and 35*b* are rotated in the annular gap 18 in a direction marked by an arrow Y.

Figure 8:
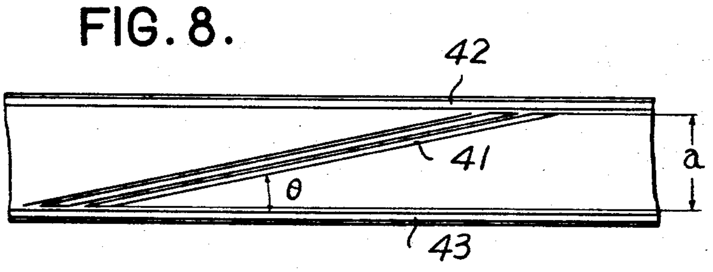
FIGURE 8 shows the arrangement of recording and control tracks on a magnetic tape, according to the invention.

Thus, as shown in FIGURE 8, diagonal tracks 41 are produced on the tape 11 at an angle $\theta$ determined by the diameter of the drum and the width $a$ of the portion of the tape used for the video signal. An audio signal track 42 and a control signal track 43 are recorded along opposite edges of the tape 11 by the fixed magnetic head 21.

In accordance with a specific feature of the invention, the diameter of the drum 17 is sufficiently large in relation to the effective tape width $a$ as to produce an angle $\theta$ which is relatively small, preferably on the order of 20 degrees or less, which is very important in promoting a smooth drive and accurate positioning of the tape, not obtainable with larger angles. An additional advantage is that it provides tracks of sufficient length as to permit the recording of an integer number of fields of a television video signal on each track, thereby avoiding a so-called "Venetian blind" effect produced when a plurality of heads move across a tape at a large angle approaching 90 degrees, each head being operative during only a portion of a field of the video signal.

As shown diagrammatically in FIGURE 5, the heads 35*a* and 35*b* are connected through a suitable commutator 44 and through a selector switch 45*a* either to the output of a recording amplifier 47 or the input of a reproducing amplifier 46. The commutator 44 may preferably provide the signal overlap mentioned above and, for example, a system may be used as disclosed in an application of Inoue and Morita entitled Channel Mixing System filed Mar. 31, 1965, Ser. No. 444,226. To synchronize the rotation of the heads, 35*a* and 35*b*, with the fields of a video signal applied to the recording amplifier 47, a control system 48 for the motor 32 is controlled from vertical synchronizing signal components developed by a synchronizing signal separator circuit 49. An output signal from the control system 48 may be applied through a selector switch 45*b* to the head 21 during recording to record a signal on the track 43. During reproduction, signals from the head 21 may be applied through the selector switch 45*b* to an input of the control system 48, to properly synchronize the phase of rotation of the motor 32. It should be noted that this general type of control arrangement is known in the prior art, reference being made to the Masterson Patent No. 2,773,120 as an example, and no claim is made to the control arrangement by itself. However, the combination of this general type of control with the above described features is important in achieving the full advantages of the invention.

By way of example, the diameter of the guide drum 17 may be 150 mm. and the tape velocity may be 190 mm./sec., while the tape may be engaged with the drum through an arcuate distance of 200 degrees. The motor 32 may be rotated at a speed of 30 revolutions per second so that one field of a conventional television signal is recorded on each track.

Figure 17:
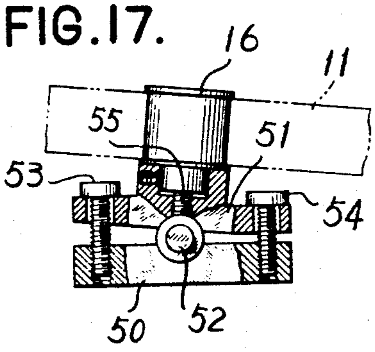
FIGURE 17 is a sectional view taken substantially along line XVII—XVII of FIGURE 14.

Referring to FIGURE 17, a lower base member 50 is attached to the lower guide drum 17*b*, and an upper base member 51 is secured thereto by screws 53, 54 with a generally horizontal balance shaft 52 interposed therebetween. The guide pole 16 is attached vertically to the upper base member 51 through a screw 55 integral therewith.

By screwing in either one of the screws 53 and 54 and screwing out the other, the inclination of the upper base relative to the lower base can be regulated with the axis of the balance shaft 52 as a fulcrum so that the inclination of the guide pole 16 can be regulated. When the pole 16 is rotated, it moves up and down according to the pitch of the screw 55 so that up and down adjustment of said pole can be carried out.

Figure 18:
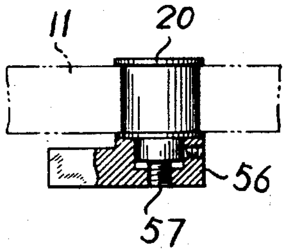
FIGURE 18 is a sectional view taken substantially along line XVIII—XVIII of FIGURE 14.

Referring to FIGURE 18, a base plate 56 is attached to the lower guide drum 17*b*. The guide pole 20 having an integral screw 57 is attached vertically on said base plate, so that it is capable of fine adjustment only in upward and downward directions, by rotation thereof. Such adjustments permit compensation for minute errors in machining, in order to permit the magnetic tape to run in the accurate predetermined path as shown in FIGURE 16.

Figure 19:
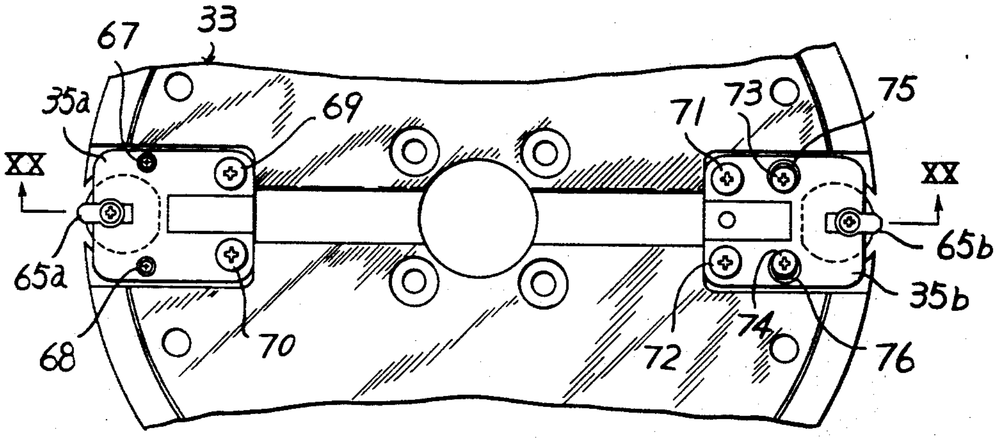
FIGURE 19 is a plan view of an embodiment of a rotating magnetic head assembly.
Figure 20:
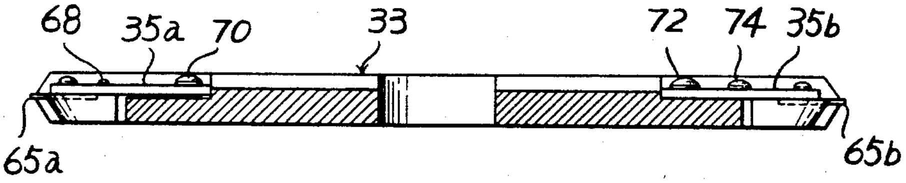
FIGURE 20 is a longitudinal sectional view of the rotating magnetic head assembly of FIGURE 19, taken substantially along line XX—XX of FIGURE 19.

FIGURE 19 is the plan view showing the attachment of the magnetic heads 35*a* and 35*b*, while FIGURE 20 is a longitudinal sectional view taken along the line XX—XX in FIGURE 19. In both figures, 65*a* and 65*b* are magnetic head tips provided at the tips of the magnetic heads 35*a* and 35*b* respectively, and said tips protrude a little out of the outer peripheral edge of the disc 33 with the video signal being recorded on and reproduced from engagement with the magnetic tape during revolution of the disc 33. In this case, if there is any error in the relative position of the head tips, the recorded or reproduced signals are not equal and unsatisfactory results are obtained. It is therefore required that both head tips should be accurately located in diametrically opposite directions and in the same horizontal plane. Now, as described below, fine adjustable means is provided to the magnetic heads 35*a*, 35*b* respectively. A spacer 66 is interposed between the lower side of the magnetic head 35*a* and the disc 33 and the head is held on the disc 33 by adjustment screws 67 and 68 and fixing screws 69 and 70. By screwing in or screwing out the adjustment screws 67, 68, magnetic head tip 65*a* moves up and down with the spacer 66 as a fulcrum, so as to be adjusted to be on the same horizontal plane with the magnetic head tip 65*b*. Similar fixing screws 71 and 72 and adjustment screws 73 and 74 are provided for the head 35*b*, but the adjustment screws 73 and 74 are inclined to permit a fine adjustment of the angular position of the head, so that the head tips 65*a* and 65*b* may be accurately located diametrically opposite to each other.

Figure 21:
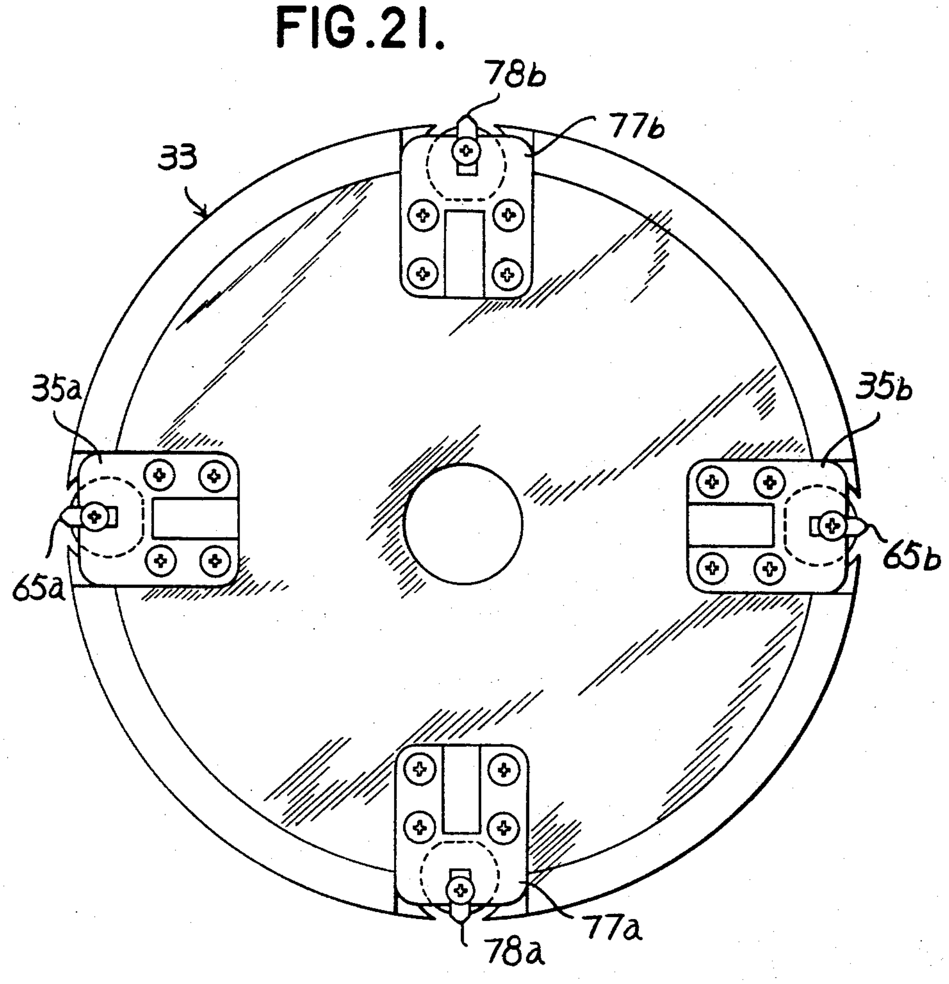
FIGURE 21 is a plan view of another embodiment of a rotating magnetic head assembly.
Figure 22:
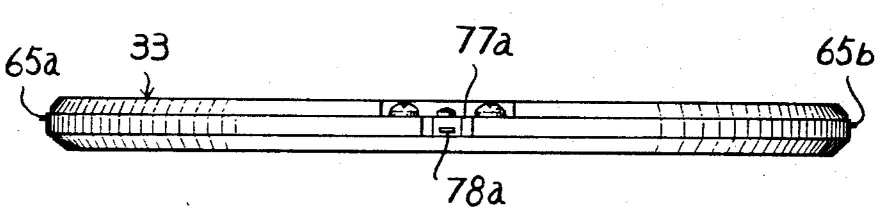
FIGURE 22 is a side view of the rotating magnetic head assembly as shown in FIGURE 21.

FIGURE 21 is a plan view of another example of the rotary magnetic head assembly while FIGURE 22 is a side view thereof. In both figures, 77*a*, 77*b* are magnetic reproducing heads for monitoring provided in diametrically opposite positions in 90 degree relation to the heads 35*a* and 35*b*. Such monitor heads 77*a* and 77*b* follow the respective magnetic recording and reproducing heads 35*a* and 35*b* in recording to permit an immediate evaluation of the quality of the recording. 78*a*, 78*b* are magnetic head tips of the magnetic heads 77*a*, 77*b* respectively and are positioned in a horizontal plane staggered in the axial direction of the disc in a level different from that of respective magnetic head tips 65*a*, 65*b* by one half gap of the pitch of the recording track formed in a manner such that they follow and scan on the recording tracks formed by the respective corresponding magnetic recording and reproducing heads. By such construction, monitor of the state in recording for the magnetic tape can be done in the recording time simultaneously.

It is also possible to use the heads 77a and 77b, or similarly positioned heads, for erasing purposes.

This invention is not limited to the embodiments described above, and it is a matter of course that many modifications may be made without departing from the spirit of this invention.

We claim as our invention:

1. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, and a pair of magnetic heads in diametrically opposed positions on said disc and having tips projecting radially outwardly through said annular gap for engagement with the tape, said guide poles being so positioned that said tape is engaged with said surfaces through an arcuate distance substantially greater than 180 degrees and sufficient to obtain stabilization of the position of the tape relative to said surfaces and stabilized intimate contact of the tape and said heads through an arcuate distance of at least 180 degrees.

2. In a system as defined in claim 1, said arcuate distance of interengagement of said tape and said surfaces being at least 190 degrees.

3. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, a pair of magnetic heads in diametrically opposed positions on said disc and having tips projecting radially outwardly through said annular gap for engagement with the tape, signal translation means, and means for alternately connecting said heads to said signal translation means, said guide poles being so positioned that said tape is engaged with said surfaces through an arcuate distance sufficient to obtain stabilization of the position of the tape relative to said surfaces and stabilized intimate contact of said heads and the tape through an arcuate distance sufficiently greater than 180 degrees to obtain a substantial overlap in the connection of said heads to said signal translation means but sufficiently less than 360 degrees to permit cooling of said heads and to avoid unnecessary waste of tape and friction.

4. In a system as defined in claim 3, said arcuate distance of interengagement of said tape and said surfaces being in the range of from 193 to 210 degrees.

5. In a system as defined in claim 3, said arcuate distance of interengagement of said tape and said surfaces being on the order of 200 degrees.

6. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, and a pair of magnetic heads in diametrically opposed positions on said disc and having tips projecting radially outwardly through said annular gap for engagement with the tape, said guide poles being so positioned that said diagonal track is at an acute angle on the order of 20 degrees or less relative to the edges of the tape.

7. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, a pair of magnetic heads in diametrically opposed positions on said disc and having tips projecting radially outwardly through said annular gap for engagement with the tape, and means for rotating said disc at a speed such that the time required for each head to rotate through 180 degrees is equal to an integer multiple of the duration of each field of said video signal.

8. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, and a pair of magnetic heads in diametrically opposed positions on said disc and having tips projecting radially outwardly through said annular gap for engagement with the tape, said guide poles being so positioned as to obtain a straight feed of the tape with the edges of the portions of the tape approaching and leaving each guide pole being in the same planes perpendicular to the pole axis.

9. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, a pair of magnetic heads in diametrically opposed positions on said disc and having tips projecting radially outwardly through said annular gap for engagement with the tape, means for feeding tape to said first guide pole including means for supporting a supply reel on an axis parallel to the axis of said first guide pole, said supply reel and first guide pole axes being so positioned as to do obtain a straight feed of the tape with the edges of the tape being in spaced parallel planes perpendicular to said axes, and means for feeding tape from said second guide pole including means for supporting a take-up reel on an axis parallel to the axis of said second guide pole, said take-up reel and second guide pole axes being so positioned as to obtain a straight feed of the tape with the edges of the tape being on spaced parallel planes perpendicular to said axes, said guide poles being so poistioned that said tape is engaged with said surfaces through an arcuate distance substantially greater than 180 degrees and sufficient to obtain stabilization of the position of the tape relative to said surfaces and stabilized intimate contact of the tape and said heads through an arcuate distance of at least 180 degrees.

10. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, and a pair of magnetic heads in diametrically opposed positions on said disc and having tips projecting radially outwardly through said annular gap for engagement with the tape, the axis of said guide surfaces being at a first predetermined angle relative to a line parallel to the axis of said second guide pole and the axes of said first guide pole being at a second predetermined angle relative to a line parallel to the axis of said second guide pole, said second predetermined angle being approximately twice said first predetermined angle and being such as to obtain a straight feed of the tape with the edges of the portions of the tape approaching and leaving each guide pole being in the same planes perpendicular to the pole axis.

11. In a system for magnetic recording and reproducing of a video signal of the type produced in response to scanning at certain line and field rates, means defining a pair of aligned coaxial generally cylindrical guide surfaces having the same diameter and having adjacent ends spaced apart to define an annular gap, means including a first guide pole for feeding magnetic tape to said guide surfaces and a second guide pole for feeding the tape from said guide surfaces with the tape extruding spirally about said surfaces and with a diagonal track exposed by said gap, a disc rotatable about said axis, a pair of magnetic heads in diametrically opposed positions on said disc and having tips projecting radially outwardly through said annular gap for engagement with the tape, and a second pair of magnetic heads respectively supported at positions on said disc in angularly spaced relation to said first pair of heads and having tips projecting through said annular gap for engagement with the tape, said second pair of heads being positioned to trace the same tracks as respectively traced by said first pair of heads.

References Cited

UNITED STATES PATENTS 3,048,665 8/1962 Wilcox.
3,179,870 4/1965 Maxey.

ROBERT L. GRIFFIN, *Primary Examiner.*

H. W. BRITTON, *Assistant Examiner.*

U.S. Cl. X.R.

179—100.2